(12) United States Patent
Brackx et al.

(10) Patent No.: US 10,110,053 B2
(45) Date of Patent: Oct. 23, 2018

(54) BATTERY POWERED SYSTEM AND METHOD FOR CHARGING

(71) Applicant: Club Car, LLC, Evans, GA (US)

(72) Inventors: Matthew S Brackx, Evans, GA (US); Paul W McLeod, Grovetown, GA (US); Robert H Edwards, Martinez, GA (US); Russell William King, Evans, GA (US)

(73) Assignee: Club Car LLC, Evans, GA (US)

( * ) Notice: Subject to any disclaimer, the term of this patent is extended or adjusted under 35 U.S.C. 154(b) by 216 days.

(21) Appl. No.: 14/973,324

(22) Filed: Dec. 17, 2015

(65) Prior Publication Data

US 2016/0190824 A1    Jun. 30, 2016

Related U.S. Application Data

(60) Provisional application No. 62/098,931, filed on Dec. 31, 2014.

(51) Int. Cl.
*H02J 7/04*   (2006.01)
*H02J 7/02*   (2016.01)
*H02J 7/00*   (2006.01)

(52) U.S. Cl.
CPC ............. *H02J 7/044* (2013.01); *H02J 7/027* (2013.01); *H02J 7/0052* (2013.01)

(58) Field of Classification Search
CPC .. H02J 7/045; H02J 7/04; H02J 7/0086; H02J 7/008
USPC ....................................................... 320/162
See application file for complete search history.

(56) References Cited

U.S. PATENT DOCUMENTS

| | | | |
|---|---|---|---|
| 6,476,583 B2 | 11/2002 | McAndrews | |
| 7,573,235 B2 | 8/2009 | Hand | |
| 8,264,202 B2 | 9/2012 | Sahu et al. | |
| 8,502,494 B2 | 8/2013 | Nieh et al. | |
| 2010/0292855 A1 | 11/2010 | Kintner-Meyer | |
| 2012/0139475 A1 | 6/2012 | Evans et al. | |
| 2012/0153902 A1* | 6/2012 | Yebka | H02J 7/0075 320/148 |
| 2013/0015860 A1 | 1/2013 | Crombez | |
| 2013/0049702 A1* | 2/2013 | Dai | H02J 7/041 320/150 |

(Continued)

FOREIGN PATENT DOCUMENTS

WO     2013186209 A2    12/2013

*Primary Examiner* — Drew A Dunn
*Assistant Examiner* — Sailesh Thapa
(74) *Attorney, Agent, or Firm* — Taft Stettinius & Hollister LLP (57) ABSTRACT

A unique method for charging a battery includes comparing a parameter to a limit, wherein the parameter relates to previous charging of the battery; determining a current state of the battery; and performing a next charging cycle based on the comparison and/or the current state of the battery. A unique system includes a vehicle, a battery, and a charging system for charging the battery. The charging system includes a controller for determining whether the battery is in short term storage or long term storage; starting a new charge cycle after a first amount of reduction in the charge of the battery if the battery is in short term storage; and starting the new charge cycle after a second amount of reduction in the charge of the battery if the battery is in long term storage.

19 Claims, 8 Drawing Sheets

(56) References Cited

U.S. PATENT DOCUMENTS

2013/0221928 A1    8/2013  Kelty et al.
2013/0307475 A1   11/2013  Kishiyama et al.
2014/0203782 A1*   7/2014  Xue .................. H02J 7/007
                                                  320/134

* cited by examiner

BATTERY POWERED SYSTEM AND METHOD FOR CHARGING

CROSS REFERENCE TO RELATED APPLICATIONS

The present application claims the benefit of U.S. Provisional Patent Application Ser. No. 62/098,931, filed Dec. 31, 2014, which is incorporated herein by reference in its entirety.

FIELD OF INVENTION

The present application relates to battery powered systems, and more particularly to methods and systems for charging a battery.

BACKGROUND

Battery powered systems and methods for charging a battery remain an area of interest. Some existing systems have various shortcomings, drawbacks and disadvantages relative to certain applications. For example, in some charging systems and methods, previous charging of the battery and the current state of the battery are not considered in determining a charge cycle for the battery. Accordingly, there remains a need for further contributions in this area of technology.

SUMMARY

Embodiments of the present application include a unique method for charging a battery. The method includes comparing a parameter to a limit, wherein the parameter relates to previous charging of the battery; determining a current state of the battery; and performing a next charging cycle based on the comparison and/or the current state of the battery. Embodiments of the present application include a unique system. The system includes a vehicle, a battery, and a charging system for charging the battery. The charging system includes a controller for determining whether the battery is in short term storage or long term storage; starting a new charge cycle after a first amount of reduction in the charge of the battery if the battery is in short term storage; and starting the new charge cycle after a second amount of reduction in the charge of the battery if the battery is in long term storage.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
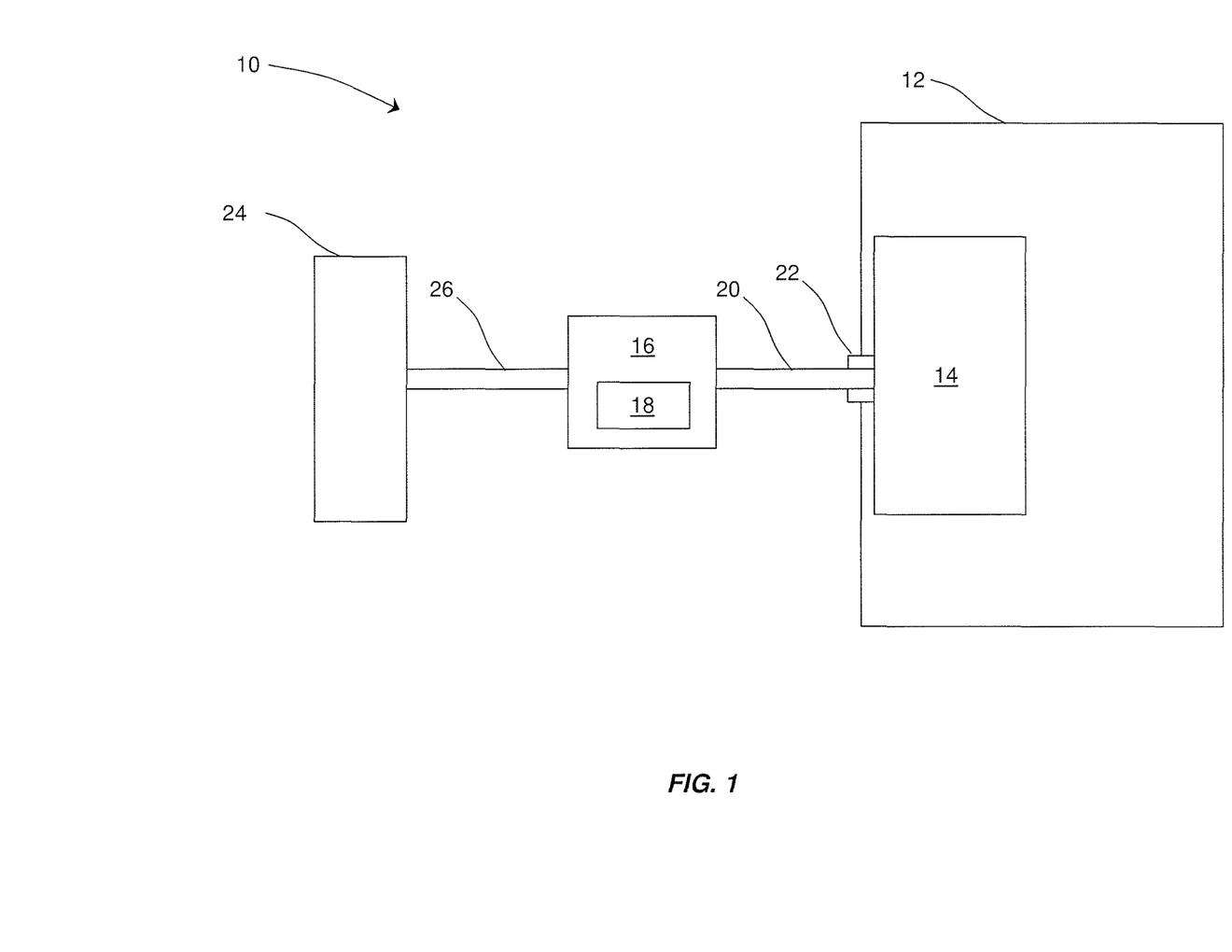
FIG. 1 schematically depicts some aspects of a non-limiting example of a battery powered system in accordance with an embodiment of the present application.

Referring to FIG. 1, some aspects of a non-limiting example of a battery powered system 10 in accordance with an embodiment of the present application is schematically depicted. In one form, system 10 is an electric task oriented machine, such as an on or off road machine configured to carry persons and or equipment to desired locations. System 10 includes a vehicle 12 powered by a battery 14, and includes a charging system 16 having a controller 18. In some embodiments, charging system 16 is built into or stored in vehicle 12, whereas in other embodiments, charging system 16 may physically separate from vehicle 12, and may be coupled to vehicle 12 only when charging of battery 14 is desired. Charging system 16 is operative to charge battery 14. During charging, charging system 16 is coupled to a battery 14 via an electrical cord or line 20 having a disconnectable plug 22, e.g., a DC connector, and to a power source 24 via an electrical cord 26 for supplying electrical power to charging system 16 for charging battery 14. Power source 24 may be, for example, a local power grid or a generator. Controller 18 is configured to execute program instructions to direct the charging of battery 14 by charging system 16. In one form, controller 18 is microprocessor based and the program instructions are in the form of software stored in a memory (not shown). However, it is alternatively contemplated that the controller and program instructions may be in the form of any combination of software, firmware and hardware, including programmable logic controllers and/or state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Battery powered vehicles, such as vehicle 12, are often left plugged into the charging system, e.g., charging system 16 when not in use. There can be competing interests in determining an appropriate charging schedule for batteries, such as battery 14. On one hand, it is desirable to keep the battery at or near a full charge so that the operator of vehicle 12 may unplug vehicle 12 from the charging system and anticipate the vehicle range and performance associated with a fully charged battery or a nearly fully charged battery. On the other hand, the longer the battery is stored, the more charging cycles it is exposed to, which may have an adverse impact on battery life and health. Accordingly, in some embodiments, it is desirable to keep the battery more fully charged during short term storage. However, for long term storage, it may be desirable to allow the charge level to drop more significantly between charging cycles, and to perform less charging cycles over a defined period of time. Thus, in some embodiments, for an operator who uses vehicle 12 more regularly, the battery may be fully or nearly fully charged at all times, whereas for an operator who uses vehicle 12 less frequently, a long term storage charging scheme may be employed, in order to promoted battery life and health. In one example, the battery may be considered to be in long term storage if it has been unused for more than 10 days, otherwise it is considered to be in short term storage. The defined amount of time associated with short term storage and with long term storage may vary with the needs of the application. In some embodiments, if the operator of vehicle 12 does not operate the vehicle during the period of time considered to be short term storage, charging system 16 will switch to long term storage mode upon the end of the time period associated with short term storage, which in some embodiments may improve battery health.

In some of the embodiments described herein below, controller 18 is configured to execute program instructions to compare one or more parameter to one or more corresponding limits. In one form, the one or more parameters relate to an amount of previous charging of battery 14 within a predetermined time period. Controller 18 may also be configured to execute program instructions to determine a current state of battery 14, and to direct charging system 16 to perform a next charging cycle for battery 14 based on the comparison and/or the current state of the battery 14. In some of the embodiments described herein, controller 18 is configured to execute program instructions to determine whether battery 14 is in short term storage or long term storage, and to direct charging system 16 to start a new charge cycle after a first amount of reduction in the charge of battery 14, if battery 14 is in short term storage; and to start a new charge cycle after a second amount of reduction in the charge of battery 14 if battery 14 is in long term storage. In some embodiments, the first amount of reduction in the charge of battery 14 pertaining to short term storage is less than the second amount of reduction pertaining to long term storage. In some embodiments, batteries that are in long term storage are charged less frequently than batteries in short term storage.

Figure 2A:
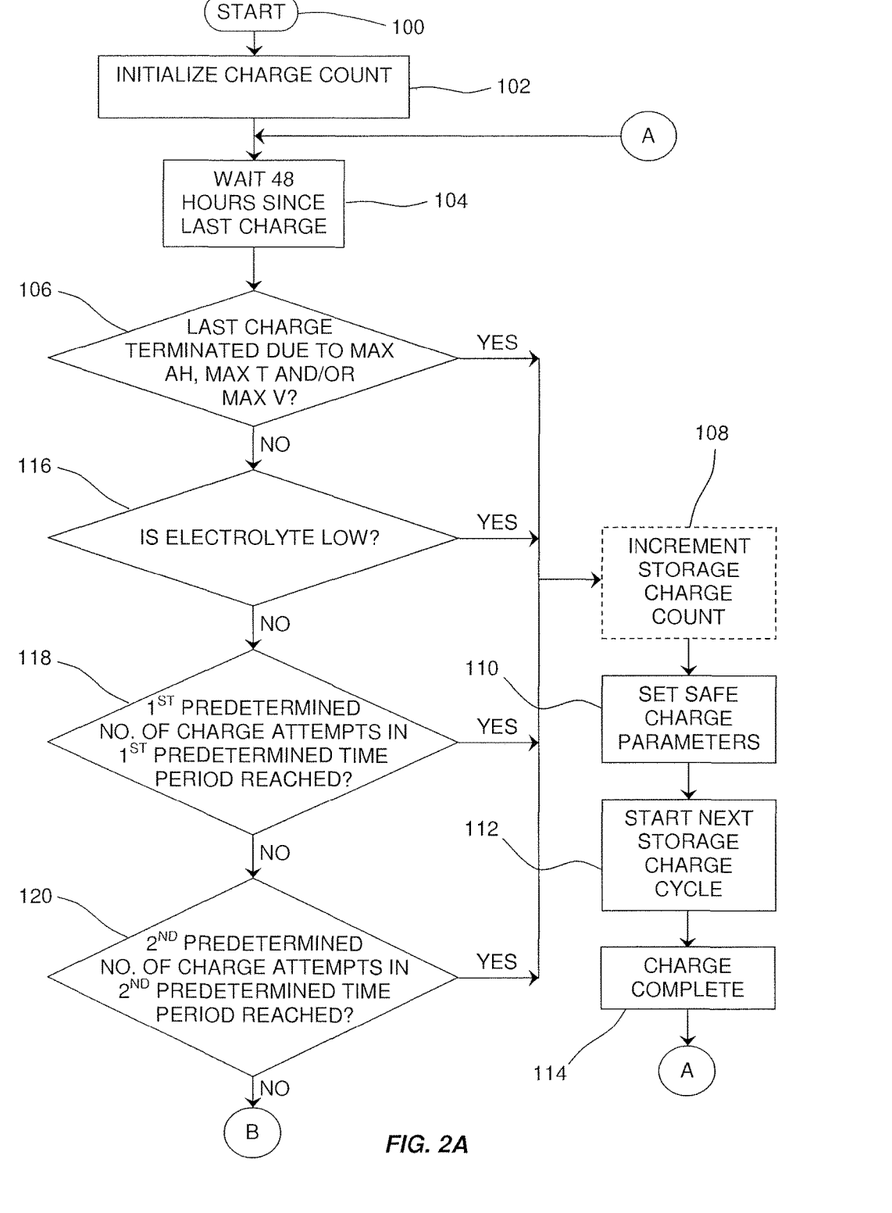
FIGS. 2A-2C are flowcharts illustrating some aspects of methods for charging a battery in accordance with non-limiting examples of embodiments of the present application.

Referring to FIG. 2A, some aspects of a method for charging a battery in accordance with a non-limiting example of an embodiment of the present application are depicted. Before the process flow begins, charging system 16 is supplied with power from power source 24. At Block 100, the process is started when DC plug 22 is plugged in to battery 14. At Block 102, a storage charge count is initialized. The storage charge count is incremented each time a battery charge cycle is performed. In some embodiments, the charge count is reset when DC plug 22 is disconnected or unplugged from battery 14. At block 104, a waiting period is undertaken after the last battery charge cycle or attempt. The purpose of the waiting period is to allow the open circuit voltage of battery 14 to stabilize or "settle". In the illustrated embodiment, the waiting period is 48 hours. In other embodiments, the waiting period may be a greater or lesser period of time as may be suitable for the particular application, e.g., based on battery characteristics and/or other battery or system constraints or charging time constraints. After the waiting period is completed, process flow proceeds to block 106. Blocks 106, 116, 118, 118A (FIG. 2B) and 120 compare various parameters against corresponding thresholds, and in some embodiments may be used to determine whether battery 14 should be charged in a safe charge mode or a normal charge mode as defined more fully below.

At block 106, controller 18 determines whether the last battery charging cycle was terminated due to reaching or exceeding a maximum Amp-hour limit for Amp-hours supplied to the battery, a maximum charging time limit and/or a maximum voltage limit during the last battery charging cycle. If the results of this comparison indicate that the last charging cycle was terminated for reaching one or more of the Amp-hour, charging time and/or voltage limits, process flow proceeds to block 108, wherein the charge count is incremented. In some embodiments, the charge count may not be incremented, and hence, block 108 is set forth in dashed lines. Process flow then proceeds to block 110, where controller 18 sets safe charge parameters. A safe charge is a charging cycle that charges battery 14 at a lower rate than a normal charge cycle. The charging rate may be reduced, for example, by reducing the voltage applied across battery 14 terminals during charging, or by otherwise controlling current flow into battery 14 during charging. In embodiments of the present application, one or more means may be employed to reduce adverse impacts of charging in order to yield a safe charge. After the safe charge parameters are set, process flow proceeds to block 112.

At block 112, the next storage charge cycle is started, using the safe charge parameters; that is, charging in a safe charging mode is started. At block 114, the charge cycle is completed, after which process flow returns to block 104.

If, at block 106, the last battery charging cycle was not terminated due to reaching the maximum Amp-hour limit, maximum charging time limit and/or maximum voltage limit, process flow proceeds to block 116. At block 116, controller 18 determines whether the battery 14 electrolyte level is low, e.g., is below a threshold. The determination may be made, for example, using a fluid level sensor. In one form, the electrolyte is considered low if the electrolyte level is ½" below a target height. In other embodiments, other values may be employed. If the electrolyte level is low, process flow proceeds to block 108, and subsequently to blocks 110, 112, 114 and then 104, as previously described. If the electrolyte level is not low, process flow proceeds to block 118.

At block 118, controller 18 determines whether excess charging has been attempted or performed, by determining whether a first predetermined number of charges or charge attempts have been made within a first predetermined period of time, e.g., two charge attempts within 24 hours. The first predetermined number of charge attempts and the first predetermined period of time may vary with the needs of the application. If the first predetermined number of charge attempts in the first predetermined period of time has been reached, process flow proceeds to block 108, and subsequently to blocks 110, 112, 114 and then 104, as previously described. If the first predetermined number of charge attempts in the first predetermined period of time has not been reached, process flow proceeds to block 120.

At block 120, controller 18 again determines whether excess charging has been attempted or performed, by determining whether a second predetermined number of charges or charge attempts have been made within second predetermined period of time, e.g., five charge attempts within three days. The second number of predetermined charge attempts and the second predetermined period of time may vary with the needs of the application. If the second predetermined number of charge attempts in the second predetermined period of time has been reached, process flow proceeds to block 108, and subsequently to blocks 110, 112, 114 and then 104, as previously described. If the second number of charge attempts in the second predetermined period of time has not been reached, process flow proceeds to block 122.

Figure 2B:
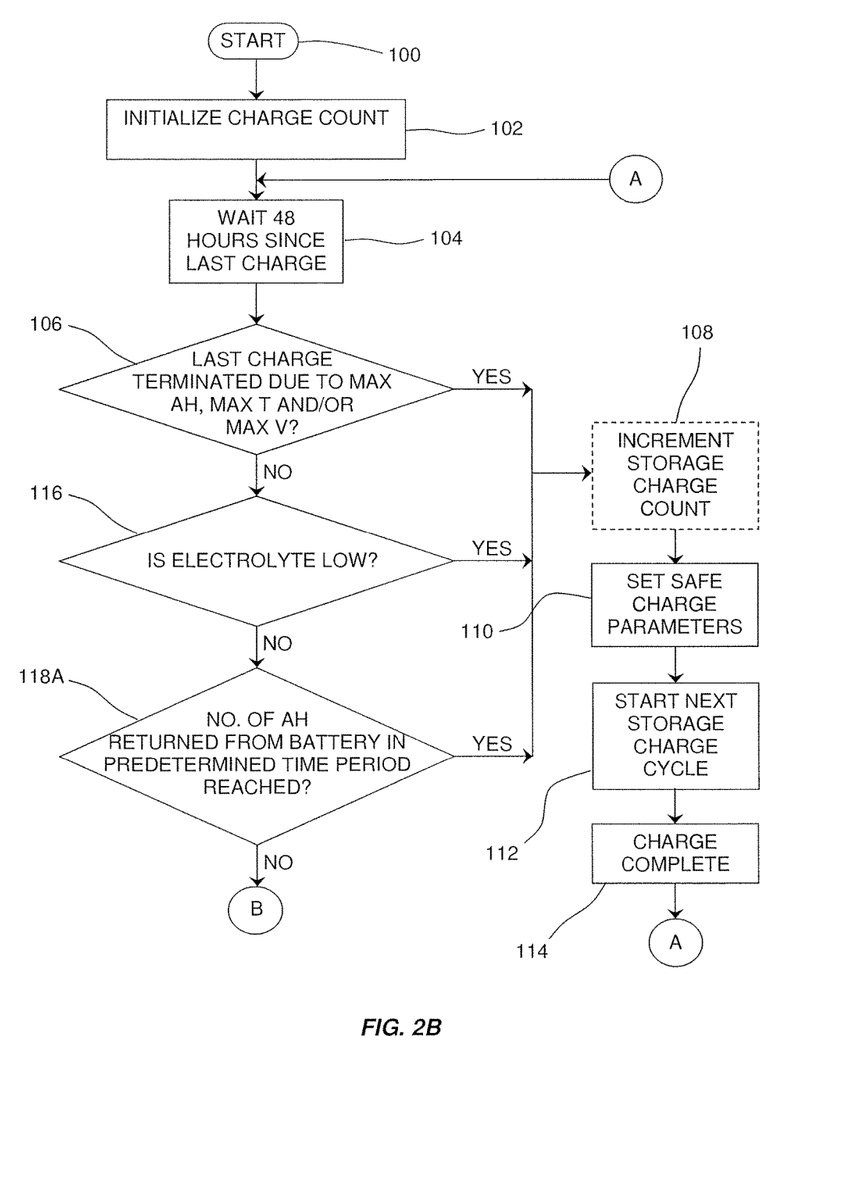

Referring to FIG. 2B, some aspects of a method for charging a battery in accordance with a non-limiting example of an embodiment of the present application are depicted. In the depiction of FIG. 2B, the process flow is the same as that as set forth above with respect to FIG. 2A, except that block 118A in FIG. 2B replaces blocks 118 and 120 in FIG. 2A. Accordingly the description of blocks 100-116 will not be repeated. Block 118A provides a different mechanism to determine if excess charging has been performed or attempted within a predetermined period of time. At block 118A, controller 18 compares the number of Amp-hours supplied to battery 14 during charging over a predetermined time period with a predetermined Amp-hour limit. The time period and the Amp-hour limit may vary with the needs of the application, e.g., based on battery size and charging characteristics. If the number of Amp-hours returned reaches or exceeds the predetermined limit within the predetermined time period, process flow proceeds to block 108 and subsequently to blocks 110, 112, 114 and then 104, as previously described. If the number of Amp-hours returned does not reach or exceed the predetermined limit, process flow proceeds to block 122 in FIG. 2C.

Figure 2C:
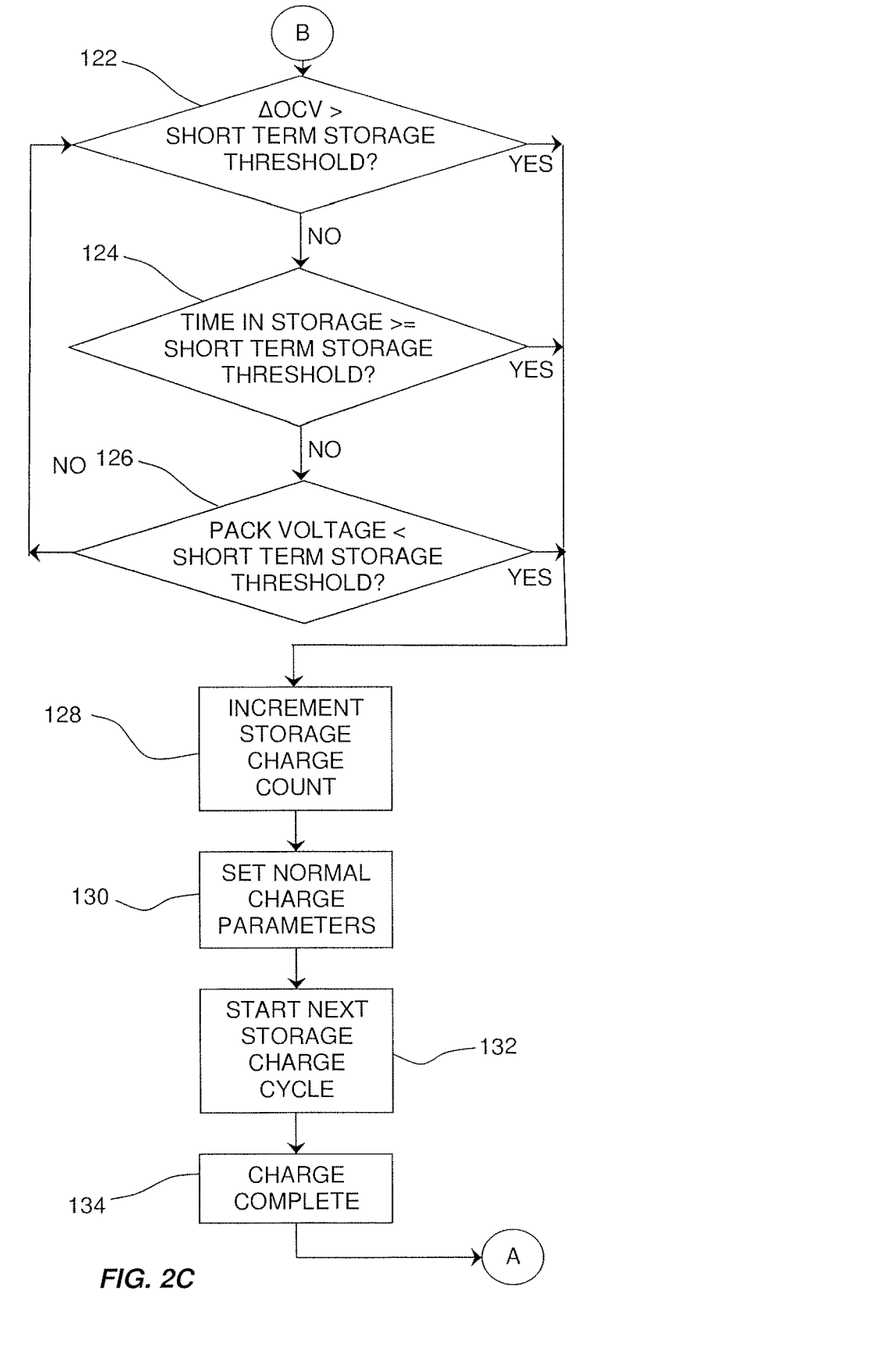

Referring to FIG. 2C, some aspects of a method for charging a battery in accordance with a non-limiting example of an embodiment of the present application are depicted. At block 122, controller 18 determines whether a change in open circuit voltage (ΔOCV) in battery 14 exceeds a predetermined threshold. In one form, the change in open circuit voltage is a change relative to the open circuit voltage of a fully charged battery 14. In other embodiments, the change in open circuit voltage may be relative to another battery 14 voltage or parameter. In various embodiments, the voltage may be a cell voltage or a pack voltage. In one form, the threshold is 0.35V, and is based on an approximate 10% drop in battery 14 electrolyte specific gravity. In other embodiments, the threshold may vary with the needs of the application, and may be determined by other means. If the change in open circuit voltage exceeds the storage charge maximum value or threshold, process flow proceeds to block 128, wherein the charge count is incremented. Process flow then proceeds to block 130, wherein controller 18 sets normal charge parameters, i.e., the charging parameters employed for charging battery 14 under normal circumstances.

At block 132, controller 18 directs the next storage charge cycle to be started, using the normal charge parameters; that is, charging in a normal mode is started. At block 134, the charge cycle is completed, after which process flow returns to block 104.

If, at block 122 the change in open circuit voltage does not exceed the threshold, process flow proceeds to block 124, wherein controller 18 determines whether the time that battery 14 is currently in storage equals or exceeds a storage time threshold, e.g., 4 days in one example. If so, process flow proceeds to blocks 128, 130, 132 and 134, before returning to block 104, as set forth above. Otherwise, process flow proceeds to block 126, wherein controller 18 determines whether the battery 14 pack voltage is less than a predetermined threshold, e.g., 50V in one non-limiting example. If so, process flow proceeds to blocks 128, 130, 132 and 134, before returning to block 104, as set forth above, otherwise, process flow returns to block 122. The determinations made in blocks 122, 124 and 126 are repeated, e.g., at some desired frequency, until a positive result (a "yes") is achieved in any one of blocks 122, 124 and 126, after which process flow proceeds to blocks 128, 130, 132 and 134 for charging the battery after the positive result is indicated, before returning to block 104, as set forth above. The processes of blocks 104 to 134 are repeated, e.g., at a desired frequency, until the DC plug 22 is disconnected from battery 14.

Figure 3:
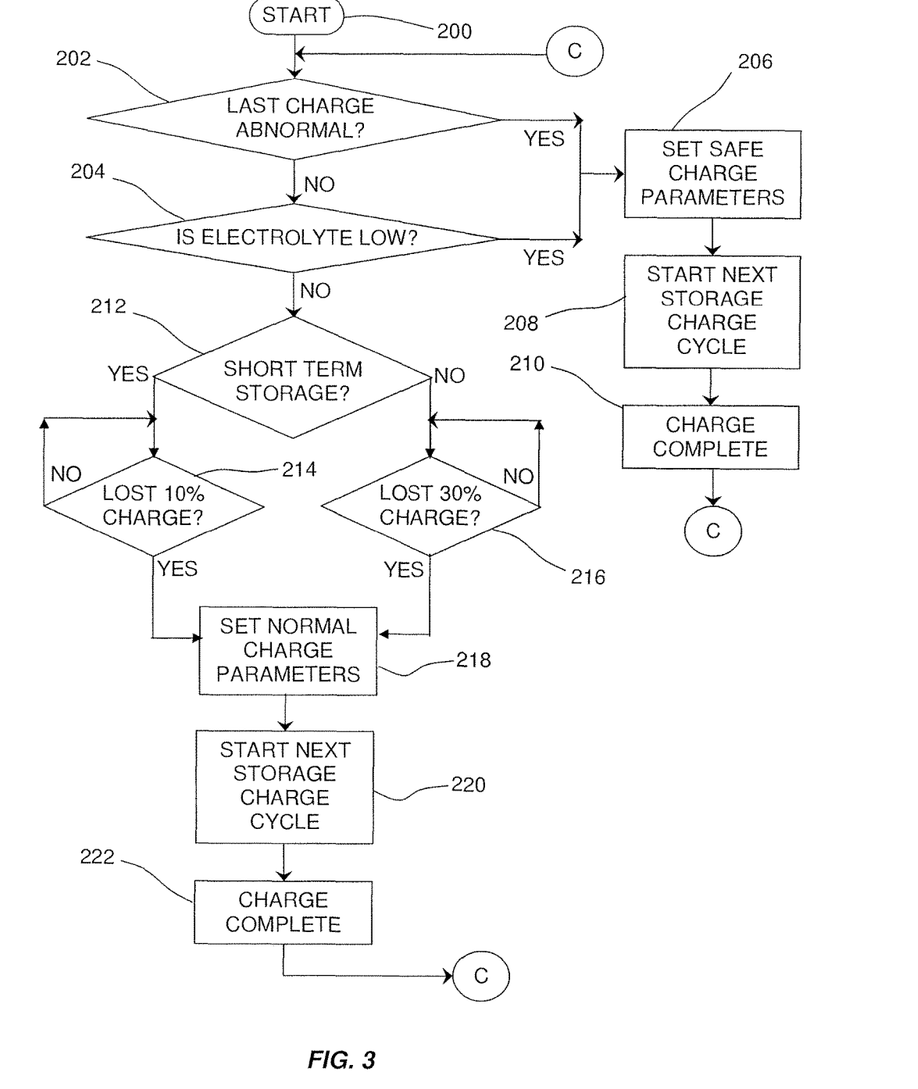
FIG. 3 is a flowchart illustrating some aspects of a method for charging a battery in accordance with a non-limiting example of an embodiment of the present application.

Referring to FIG. 3, some aspects of a method for charging a battery in accordance with a non-limiting example of an embodiment of the present application are depicted. Before the process flow begins, charging system 16 is supplied with power from power source 24. Process flow begins at block 200 when DC plug 22 of charging system 16 is plugged in to battery 14. Blocks 202 and 204 compare various parameters against corresponding thresholds, and in some embodiments may be used to determine whether battery 14 should be charged in a safe charge mode or a normal charge mode. At block 202, controller 18 determines whether the last, i.e., previous charge cycle was abnormal. An abnormal charge cycle may be indicated in one or more of a plurality of manners, e.g., if the charge cycle was terminated due to Amp-hours, charge time, voltage or temperature exceeding limits, or if the number of charge or charge attempts or Amp-hours supplied to battery 14 exceeded desirable values within some time period. In other embodiments, other data may be employed to determine whether an abnormal charge or charge event occurred. If the last cycle was an abnormal charge or charge attempt, process flow proceeds to block 206, wherein controller 18 sets safe charge parameters. After the safe charge parameters are set, process flow proceeds to block 208.

At block 208, the next storage charge cycle is started, using the safe charge parameters; that is, charging in a safe mode is started. At block 210, the charge cycle is completed, after which process flow returns to block 202.

If, at block 202, the last charge was not determined to be abnormal, process flow proceeds to block 204. At block 204, controller 18 determines whether the battery 14 electrolyte level is low, e.g., is below a threshold. The determination may be made, for example, using a fluid level sensor. In one form, the electrolyte is considered low if the electrolyte level is ½" below a target height. In other embodiments, other values may be employed. If the electrolyte level is low, process flow proceeds to block 206, and subsequently to blocks 208 and 210, and then 202, as previously described. If the electrolyte level is not low, process flow proceeds to block 212.

At block 212, controller 18 determines whether battery 14 is in short term storage. In one form, battery 14 is considered to be in short term storage if plug 22 has been plugged into it for 10 days or less, whereas battery 14 is considered to be in long term storage if plug 22 has been plugged into it for more than 10 days. The time threshold for determining whether battery 14 is in short term storage or long term storage may vary with the needs of the application. If battery 14 is determined to be in short term storage, process flow proceeds to block 214, where controller 18 determines if battery 14 has lost 10% of it's charge, e.g., as indicated by comparing one or more parameters against a threshold, such as a reduction or change in electrolyte specific gravity, open circuit voltage, state of charge and/or other parameters. If battery 14 has not lost 10% of its charge, process flow reenters block 214 after a time delay, and determines again whether battery 14 has lost 10% of its charge. The length of the time delay may vary with the needs of the application. Once battery 14 has lost 10% of its charge, process flow proceeds to block 218.

At block 218, controller 18 sets normal charge parameters, i.e., the charging parameters employed for charging battery 14 under normal circumstances. At block 220, controller 18 directs the next storage charge cycle to be started, using the normal charge parameters; that is, charging in normal mode is started. At block 222, the charge cycle is completed, after which process flow returns to block 202.

If, at block 212, controller 18 determines that battery is not in short term storage, i.e., that battery 14 is in long term storage, process flow proceeds to block 216, wherein controller 18 determines if battery 14 has lost 30% of it's charge, e.g., as indicated by comparing one or more parameters against a threshold, such as a reduction in electrolyte specific gravity, open circuit voltage, state of charge and/or other parameters. If battery 14 has not lost 30% of its charge, process flow reenters block 216 after a time delay, and determines again whether battery 14 has lost 30% of its charge. The length of the time delay may vary with the needs of the application. Once battery 14 has lost 30% of its charge, process flow proceeds to blocks 218, 220, 222 and then 202, as described above. The processes of blocks 202 to 222 are repeated, e.g., at a desired frequency, until the DC plug 22 is disconnected from battery 14. Because it takes longer for a given battery to lose 30% of its charge while in storage than to lose 10% of its charge, when battery 14 is in long term storage it will be charged less frequently than a battery in short term storage.

Figure 4A:
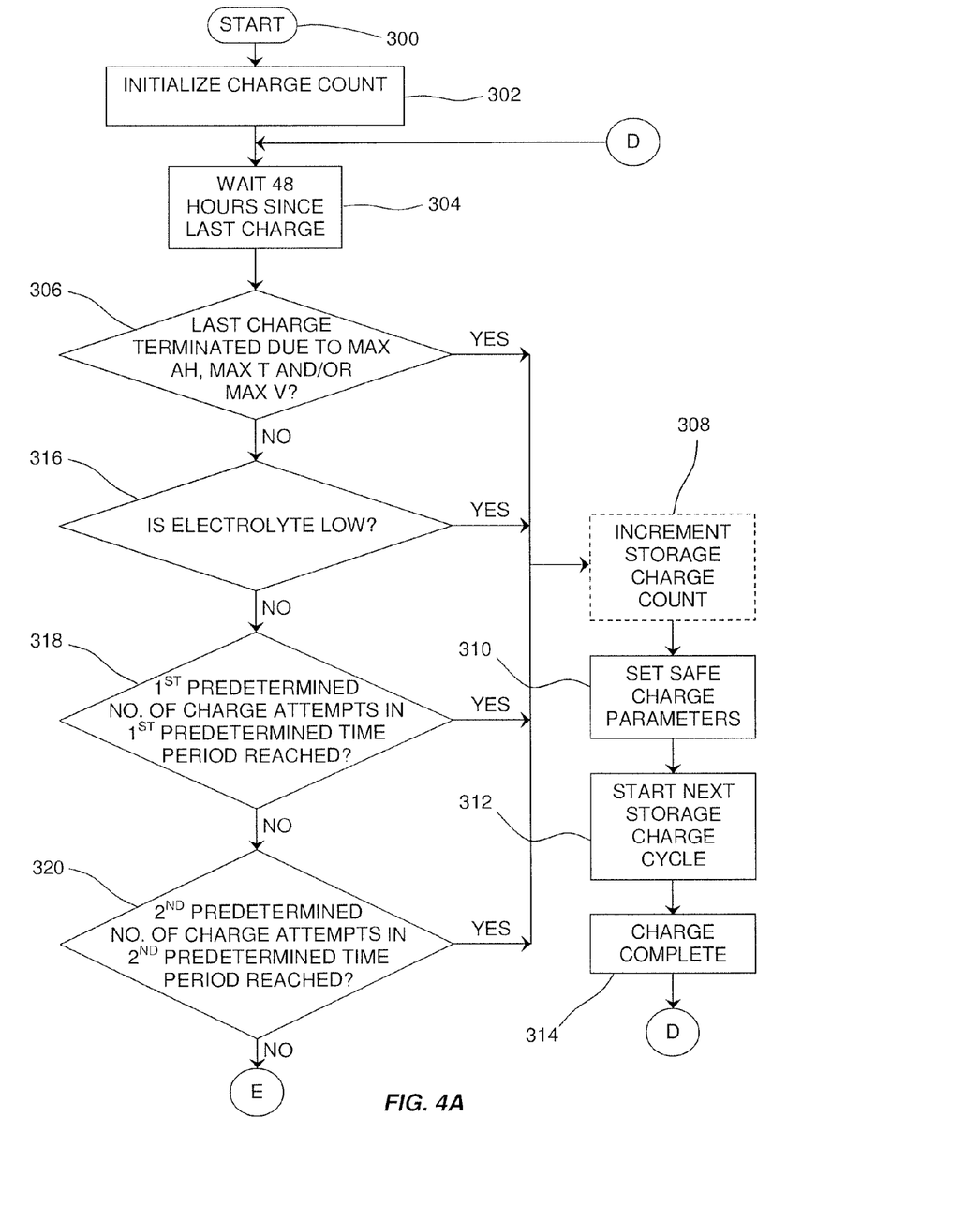
FIGS. 4A-4C are flowcharts illustrating some aspects of methods for charging a battery in accordance with non-limiting examples of embodiments of the present application.

Referring to FIG. 4A, some aspects of a method for charging a battery in accordance with a non-limiting example of an embodiment of the present application are depicted. Before the process flow begins, charging system 16 is supplied with power from power source 24. At Block 300, the process is started when DC plug 22 of charging system 16 is plugged in to battery 14. At Block 302, a storage charge count is initialized. The storage charge count is incremented each time a battery charge cycle is performed or is attempted. In some embodiments, the charge count is reset when DC plug 22 is disconnected or unplugged from battery 14. At block 304, a waiting period is undertaken after the last battery charge cycle or attempt. The purpose of the waiting period is to allow the open circuit voltage of battery 14 to stabilize or "settle". In the illustrated embodiment, the waiting period is 48 hours. In other embodiments, the waiting period may be a greater or lesser period of time as may be suitable for the particular application, e.g., battery characteristics and/or other battery or system constraints or charging time constraints. Upon completion of the waiting period, process flow proceeds to block 306. Blocks 306, 316, 318 and 320 compare various parameters against corresponding thresholds, and in some embodiments may be used to determine whether battery 14 should be charged in a safe charge mode or a normal charge mode.

At block 306, controller 18 determines whether the last battery charging cycle was terminated due to reaching a maximum Amp-hour limit for Amp-hours supplied to the battery, a maximum charging time limit and/or a maximum voltage limit during the last battery charging cycle. If the results of this comparison indicate that the last charging cycle was terminated for reaching one or more of the Amp-hour, charging time and/or voltage limits, process flow proceeds to block 308, wherein the charge count is incremented. In some embodiments, the charge count may not be incremented, and hence, block 308 is set forth in dashed lines. Process flow then proceeds to block 310, where controller 18 sets safe charge parameters. After the safe charge parameters are set, process flow proceeds to block 312.

At block 312, the next storage charge cycle is started, using the safe charge parameters; that is, charging in a safe mode is started. At block 314, the charge cycle is completed, after which process flow returns to block 304.

If, at block 306, the last battery charging cycle was not terminated due to reaching a maximum Amp-hour limit, a maximum charging time limit or a maximum voltage limit, process flow proceeds to block 316. At block 316, controller 18 determines whether the battery 14 electrolyte level is low, e.g., is below a threshold. The determination may be made, for example, using a fluid level sensor. In one form, the electrolyte is considered low if the electrolyte level is ½" below a target height. In other embodiments, other values may be employed. If the electrolyte level is low, process flow proceeds to block 308, and subsequently to blocks 310, 312, 314 and then 304, as previously described. If the electrolyte level is not low, process flow proceeds to block 318.

At block 318, controller 18 determines whether excess charging has been attempted or performed, by determining whether a first predetermined number of charges or charge attempts have been made within a first predetermined period of time, e.g., two charge attempts within 24 hours. The first predetermined number of charge attempts and the first predetermined period of time may vary with the needs of the application. If the first predetermined number of charge attempts in the first predetermined period of time has been reached, process flow proceeds to block 308, and subsequently to blocks 310, 312, 314 and then 304, as previously described. If the first predetermined number of charge attempts in the first predetermined period of time has not been reached, process flow proceeds to block 320.

At block 320, controller 18 again determines whether excess charging has been attempted or performed, by determining whether a second predetermined number of charges or charge attempts have been made within a second predetermined period of time, e.g., five charge attempts within three days. The second number of charge attempts and the second predetermined period of time may vary with the needs of the application. If the second predetermined number of charge attempts in the second predetermined period of time has been reached, process flow proceeds to block 308, and subsequently to blocks 310, 312, 314 and then 304, as previously described. If the second predetermined number of charge attempts in the second predetermined period of time has not been reached, process flow proceeds to block 322.

Figure 4B:
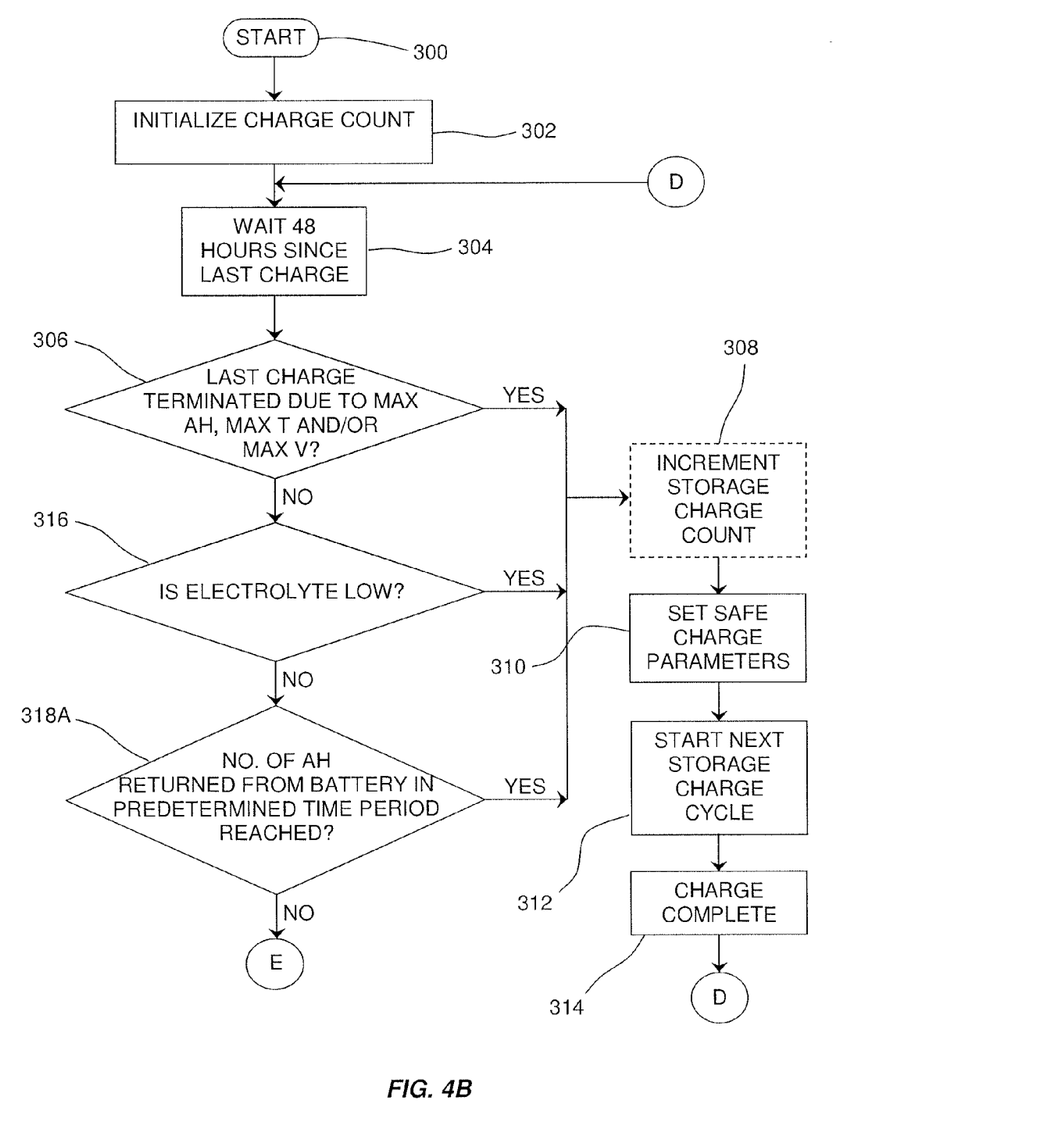

Referring to FIG. 4B, some aspects of a method for charging a battery in accordance with a non-limiting example of an embodiment of the present application are depicted. In the depiction of FIG. 4B, the process flow is the same as that as set forth above with respect to FIG. 4A, except that block 318A in FIG. 4B replaces blocks 318 and 320 in FIG. 4A. Accordingly the description of blocks 300-316 will not be repeated. Block 318A provides a different mechanism to determine if excess charging has been performed or attempted within a predetermined period of time. At block 318A, controller 18 compares the number of Amp-hours supplied to battery 14 during charging over a predetermined time period with a predetermined Amp-hour limit. The time period and the Amp-hour limit may vary with the needs of the application, e.g., based on battery size and charging characteristics. If the number of Amp-hours supplied to the battery reaches or exceeds the Amp-hour limit or threshold within the predetermined time period, process flow proceeds to block 308 and subsequently to blocks 310, 312, 314 and then back to 304, as previously described. If the number of Amp-hours returned does not reach or exceed the predetermined limit, process flow proceeds to block 322 in FIG. 4C.

Figure 4C:
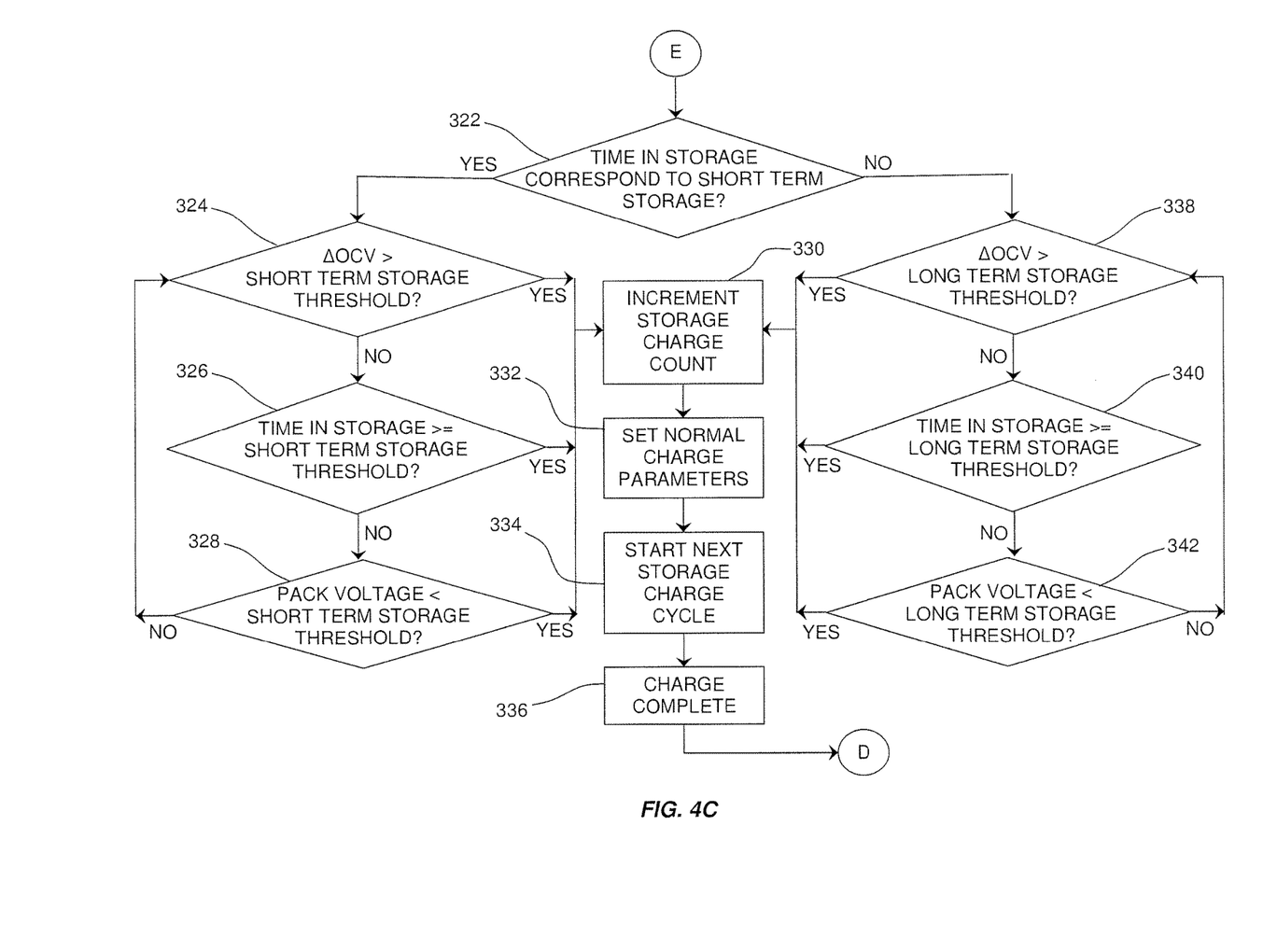

Referring to FIG. 4C, some aspects of a method for charging a battery in accordance with a non-limiting example of an embodiment of the present application are depicted. At block 322, controller 18 determines whether the time that battery 14 is in storage corresponds to short term storage. In one form, battery 14 can be considered to be in short term storage if plug 22 has been connected for 10 days or less, whereas battery 14 can be considered to be in long term storage if plug 22 has been connected for more than 10 days. The time threshold for determining whether battery 14 is in short term storage or long term storage may vary with the needs of the application. If battery 14 is determined to be in short term storage, process flow proceeds to block 324. Blocks 324, 326 and 328 pertain to three different parameters that reflect of an amount of reduction in battery 14 charge while battery 14 is in short term storage mode, and are used for determining when battery 14 should be charged while in short term storage.

At block 324, controller 18 determines whether a change in open circuit voltage (ΔOCV) of battery 14 exceeds a threshold selected for use with short term storage. In one form, the change in open circuit voltage is a change relative to the open circuit voltage of a fully charged battery 14. In other embodiments, the change in open circuit voltage may be relative to another battery 14 voltage or parameter. In one form, the threshold is 0.50V, and is based on an approximate 10% drop in battery 14 electrolyte specific gravity. In other embodiments, the threshold may vary with the needs of the application, and may be determined by other means.

If the change in open circuit voltage exceeds the storage charge maximum value or threshold, process flow proceeds to block 330, wherein the charge count is incremented. Process flow then proceeds to block 332, wherein controller 18 sets normal charge parameters, i.e., the charging parameters employed for charging battery 14 under normal circumstances. At block 334, controller 18 directs the next storage charge cycle to be started, using the normal charge parameters; that is, charging in a normal mode is started. At block 336, the charge cycle is completed, after which process flow returns to block 304.

If, at block 324 the change in open circuit voltage does not exceed the threshold, process flow proceeds to block 326, wherein controller 18 determines whether the time that battery 14 is currently in storage equals or exceeds a storage time threshold, e.g., 4 days in one example. If so, process flow proceeds to blocks 330, 332, 334 and 336, before returning to block 304, as previously described. Otherwise, process flow proceeds to block 328, wherein controller 18 determines whether the battery 14 pack voltage is less than a predetermined threshold, e.g., 50V in one non-limiting example. If so, process flow proceeds to blocks 330, 332, 334 and 336, before returning to block 304, as previously described. Otherwise, process flow returns to block 324. The determinations made in blocks 324, 326 and 328 are repeated, e.g., at desired frequency, until a positive result (a "yes") is achieved in any one of blocks 324, 326 and 328, after which process flow proceeds to blocks 330, 332, 334 and 336, completing a normal charging cycle, before returning to block 304, as described above.

If, at block 322, controller 18 determines that battery 14 is not in short term storage, i.e., that battery 14 is in long term storage, process flow proceeds to block 338. Blocks 338, 340 and 342 pertain to three different parameters that reflect of an amount of reduction in battery 14 charge while battery 14 is in long term storage mode, and are used for determining when battery 14 should be charged while in long term storage.

At block 338, controller 18 determines whether a change in open circuit voltage (ΔOCV) in battery 14 exceeds a predetermined threshold selected for use with long term storage. In one form, the change in open circuit voltage is a change relative to the open circuit voltage of a fully charged battery 14. In other embodiments, the change in open circuit voltage may be relative to another battery 14 voltage or parameter. In one form, the threshold is 1.50V, and is based on an approximate 30% drop in battery 14 electrolyte specific gravity. In other embodiments, the threshold may vary with the needs of the application, and may be determined by other means. If the change in open circuit voltage exceeds the storage charge maximum value or threshold, process flow proceeds to blocks 330, 332, 334 and 336, completing a normal charge cycle before returning to block 304, as set forth above.

If, at block 338 the change in open circuit voltage does not exceed the threshold, process flow proceeds to block 340, where controller 18 determines whether the time that battery 14 is currently in storage equals or exceeds a long term storage time threshold, e.g., 15 days in one example. If so, process flow proceeds to blocks 330, 332, 334 and 336, before returning to block 304, as described above. Otherwise, process flow proceeds to block 342, wherein controller 18 determines whether the battery 14 pack voltage is less than a predetermined threshold, e.g., 48V in one non-limiting example. If so, process flow proceeds to blocks 330, 332, 334 and 336, before returning to block 304, as previously described. Otherwise, process flow returns to block 338. The determinations made in blocks 338, 340 and 342 are repeated, e.g., at desired frequency, until a positive result (a "yes") is achieved in any one of blocks 338, 340 and 342, after which process flow proceeds to blocks 330, 332, 334 and 336 to complete a normal charge cycle, before returning to block 304, as previously described. The processes of blocks 304 to 342 are repeated, e.g., at a desired frequency, until the DC plug 22 is disconnected from battery 14.

Embodiments of the present application include a method for charging a battery, comprising: comparing a parameter to a threshold, wherein the parameter is related to a previous charging of the battery; determining a current state of the battery; and performing a next charging cycle for the battery based on the comparison and/or the current state of the battery.

In a refinement, the performing includes charging in a safe charge mode if the parameter exceeds the threshold; and wherein the performing includes charging in a normal charge mode if the parameter does not exceed the threshold.

In another refinement, the comparing includes the comparing includes determining if the previous charging was terminated because an amp-hour limit was reached during the previous charging and/or a voltage limit was reached during the previous charging and/or a charging time limit was reached during the previous charging.

In yet another refinement, the comparing includes determining if a number of charging cycles exceeds a first threshold within a first predetermined period of time and/or determining whether a number of amp-hours returned by the battery during previous charging within a second predetermined time period exceeds a second threshold.

In still another refinement, the comparing includes determining if an electrolyte level in the battery is below a threshold.

In yet still another refinement, the determining of the current state of the battery includes determining whether a change in an open circuit voltage of the battery exceeds a threshold; and wherein the performing includes charging in a normal charge mode if the change in the open circuit voltage exceeds the threshold.

In a further refinement, the determining of the current state of the battery includes determining whether a current storage time for the battery exceeds a threshold; and wherein the performing includes charging in a normal charge mode if the storage time exceeds the threshold.

In a yet further refinement, the determining of the current state of the battery includes determining whether a battery voltage is less than a threshold; and wherein the performing includes charging in a normal charge mode when the battery voltage is less than the threshold.

In a still further refinement, the method further comprises determining whether the battery is in a short term storage or a long term storage, wherein the determining of the current state of the battery includes determining whether a change in an open circuit voltage of the battery exceeds a first threshold if the battery is in short term storage, or exceeds a second threshold different from the first threshold if the battery is in long term storage.

In a yet still further refinement, the method further comprises determining whether the battery is in a short term storage or a long term storage, wherein the determining of the current state of the battery includes determining whether a current storage time for the battery exceeds a first threshold if the battery is in short term storage or exceeds a second threshold different than the first threshold if the battery is in long term storage.

In another further refinement, the method further comprises determining whether the battery is in a short term storage or a long term storage, wherein the determining of the current state of the battery includes determining whether a battery voltage is less than a first threshold if the battery is in short term storage or is less than a second threshold different from the first threshold if the battery is in long term storage.

In still another further refinement, the method further comprises determining whether the battery is in a short term storage or a long term storage; and charging the battery with a lower frequency of charging if the battery is in long term storage than if the battery is in short term storage.

Embodiments of the present application include a system, comprising: a vehicle; a battery operative to supply power to the vehicle; a charging system operative to charge the battery, wherein the charging system includes a controller operative to execute program instructions for: determining whether the battery is in a short term storage or a long term storage; starting a new charge cycle after a first amount of reduction in a charge of the battery if the battery is in short term storage; and starting the new charge cycle after a second amount of reduction in the charge of the battery if the battery is in long term storage, wherein the first amount of reduction of charge is different than the second amount of reduction of charge.

In a refinement, the method further comprises determining a current state of the battery, wherein the determining of the current state of the battery includes comparing a parameter to a threshold; wherein the threshold includes a first threshold used when the battery is in short term storage and a second threshold used when the battery is in long term storage; and wherein the new charge cycle is started based on the comparison.

In another refinement, the method further comprises determining a current state of the battery, wherein the determining of the current state of the battery includes determining a change in open circuit voltage, a time in storage and/or a pack voltage, first comparing the change in open circuit voltage to a first threshold, second comparing the time in storage to a second threshold and/or third comparing the pack voltage to a third threshold; wherein the starting of the new charge cycle is performed based on the first, second and/or third comparisons.

In yet another refinement, the method further comprises determining whether an electrolyte level in the battery is below a threshold; and starting the new charge cycle in a safe charge mode if the electrolyte level is below the threshold.

In still another refinement, the method further comprises comparing a parameter to a threshold, wherein the parameter is related to a previous charging of the battery; performing the new charge cycle in a safe charge mode if the parameter exceeds the threshold; and performing the new charge cycle in a normal charge mode if the parameter does not exceed the threshold.

In still another refinement, the comparing includes determining if the previous charging was terminated because an amp-hour limit was reached during the previous charging and/or a voltage limit was reached during the previous charging and/or a charging time limit was reached during the previous charging.

In yet still another refinement, the comparing includes determining if a number of charge cycles exceeds a first threshold within a first period of time and/or determining if a number of amp-hours returned by the battery during the previous charging within a second period of time exceeds a second threshold.

Embodiments of the present application include a method for charging a battery, comprising: coupling the battery to a charging system; a step for comparing a parameter related to previous charging of the battery to a threshold; a step for determining a current state of the battery; and a step for determining a charging for the battery based on the step for comparing and the step for determining.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a", "an", "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method for charging a battery, comprising:
comparing a parameter to a threshold, wherein the parameter is related to a previous charging of the battery;

determining a current state of the battery;
performing a next charging cycle for the battery based on at least one of the comparison and the current state of the battery; and
determining whether the battery is in a short term storage or a long storage, wherein the determining of the current state of the battery includes determining whether a change in an open circuit voltage of the battery exceeds a first threshold if the battery is in short term storage, or exceeds a second threshold different from the first threshold if the battery is in long term storage.

2. The method of claim 1, wherein the performing includes charging in a safe charge mode if the parameter exceeds the threshold; and wherein the performing includes charging in a normal charge mode if the parameter does not exceed the threshold.

3. The method of claim 1, wherein the comparing includes determining if the previous charging was terminated because an amp-hour limit was reached during the previous charging and/or a voltage limit was reached during the previous charging and/or a charging time limit was reached during the previous charging.

4. The method of claim 1, wherein the comparing includes at least one of determining if a number of charging cycles exceeds a first threshold within a first predetermined period of time and determining whether a number of amp-hours supplied to the battery during the previous charging within a second predetermined time period exceeds a second threshold.

5. The method of claim 1, wherein the comparing includes determining if an electrolyte level in the battery is below a threshold.

6. The method of claim 1, wherein the determining of the current state of the battery includes determining whether a change in an open circuit voltage of the battery exceeds a threshold; and wherein the performing includes charging in a normal charge mode if the change in the open circuit voltage exceeds the threshold.

7. The method of claim 1, wherein the determining of the current state of the battery includes determining whether a current storage time for the battery exceeds a threshold; and wherein the performing includes charging in a normal charge mode if the storage time exceeds the threshold.

8. The method of claim 1, wherein the determining of the current state of the battery includes determining whether a current battery voltage is less than a threshold; and wherein the performing includes charging in a normal charge mode if the battery voltage is less than the threshold.

9. The method of claim 1, further comprising determining whether the battery is in a short term storage or a long term storage, wherein the determining of the current state of the battery includes determining whether a current storage time for the battery exceeds a first threshold if the battery is in short term storage or exceeds a second threshold different than the first threshold if the battery is in long term storage.

10. The method of claim 1, further comprising determining whether the battery is in a short term storage or a long term storage, wherein the determining of the current state of the battery includes determining whether a current battery voltage is less than a first threshold if the battery is in short term storage or is less than a second threshold different from the first threshold if the battery is in long term storage.

11. The method of claim 1, further comprising determining whether the battery is in a short term storage or a long term storage; and charging the battery with a lower frequency of charging if the battery is in long term storage than if the battery is in short term storage.

12. A system, comprising:
a vehicle;
a battery operative to supply power to the vehicle;
a charging system operative to charge the battery, wherein the charging system includes a controller operative to execute program instructions for:
determining whether the battery is in a short term storage or a long term storage;
starting a new charge cycle after a first amount of reduction in a charge of the battery if the battery is in short term storage;
starting the new charge cycle after a second amount of reduction in the charge of the battery if the battery is in long term storage, and
wherein the first amount of reduction in the charge of the battery is less than the second amount of reduction of charge.

13. The system of claim 12, further comprising determining a current state of the battery, wherein the determining of the current state of the battery includes comparing a parameter to a threshold; wherein the threshold includes a first threshold used when the battery is in short term storage and a second threshold used when the battery is in long term storage; and wherein the new charge cycle is started based on the comparison.

14. The system of claim 12, further comprising determining a current state of the battery, wherein the determining of the current state of the battery includes determining at least one of a change in open circuit voltage, a current time in storage and a pack voltage; first comparing the change in open circuit voltage to a first threshold, second comparing the current time in storage to a second threshold and third comparing the pack voltage to a third threshold; wherein the starting of the new charge cycle is performed based on at least one of the first, second and third comparisons.

15. The system of claim 12, further comprising determining whether an electrolyte level in the battery is below a threshold; and starting the new charge cycle in a safe charge mode if the electrolyte level is below the threshold.

16. The system of claim 12, further comprising:
comparing a parameter to a threshold, wherein the parameter is related to a previous charging of the battery;
performing the new charge cycle in a safe charge mode if the parameter reaches the threshold; and
performing the new charge cycle in a normal charge mode if the parameter does not each the threshold.

17. The system of claim 16, wherein the comparing includes determining if the previous charging was terminated because of an occurrence of at least one of an amp-hour limit was reached during the previous charging, a voltage limit was reached during the previous charging, and a charging time limit was reached during the previous charging.

18. The system of claim 16, wherein the comparing includes at least one of determining if a number of charge cycles exceeds a first threshold within a first period of time and determining if a number of amp-hours supplied to the battery during the previous charging within a second period of time exceeds a second threshold.

19. A method for charging a battery, comprising:
coupling the battery to a charging system;
a step for comparing a parameter related to previous charging of the battery to a threshold;
a step for determining a current state of the battery;

a step for determining a charging for the battery based on the step for comparing and the step for determining; and a step for determining whether the battery is in a short term storage or a long term storage, wherein the determining of the current state of the battery includes determining whether a current storage time for the battery exceeds a first threshold if the battery is in short term storage or exceeds a second threshold different than the first threshold if the battery is in long term storage.

* * * * *